US 10,677,372 B2

(12) United States Patent
Maiwald et al.

(10) Patent No.: US 10,677,372 B2
(45) Date of Patent: Jun. 9, 2020

(54) ELECTROMAGNETIC ACTUATOR OF A VALVE DEVICE

(71) Applicant: Kendrion (Villingen) GmbH, Villingen-Schwenningen (DE)

(72) Inventors: Wolfram Maiwald, Obereschach (DE); Tsuneo Suzuki, Mönchweiler (DE); Ralf Heingl, Villingen-Schwenningen (DE); Florian Schulz, Brigachtal (DE)

(73) Assignee: Kendrion (Villingen) GmbH, Obereschach (DE)

( * ) Notice: Subject to any disclaimer, the term of this patent is extended or adjusted under 35 U.S.C. 154(b) by 0 days.

(21) Appl. No.: 15/763,302

(22) PCT Filed: Sep. 15, 2016

(86) PCT No.: PCT/EP2016/071793
§ 371 (c)(1),
(2) Date: Mar. 26, 2018

(87) PCT Pub. No.: WO2017/050626
PCT Pub. Date: Mar. 30, 2017

(65) Prior Publication Data
US 2018/0283573 A1    Oct. 4, 2018

(30) Foreign Application Priority Data

Sep. 25, 2015    (DE) .......... 10 2015 116 240

(51) Int. Cl.
*F16K 31/06*    (2006.01)
*F02M 59/46*    (2006.01)
(Continued)

(52) U.S. Cl.
CPC ....... *F16K 31/0682* (2013.01); *F02M 51/061* (2013.01); *F02M 51/0678* (2013.01);
(Continued)

(58) Field of Classification Search
CPC ........ F16K 31/0682; H01F 7/16; H01F 7/081; H01F 7/1638; H01F 2007/086;
(Continued)

(56) References Cited

U.S. PATENT DOCUMENTS 2,303,066 A * 11/1942 Ray ..................... F16K 31/0658
251/129.16
2,461,772 A * 2/1949 Ray ..................... F16K 31/0658
251/129.16
(Continued)

FOREIGN PATENT DOCUMENTS

DE        3332822 A1    3/1985
DE    102007005915 B3    8/2008
(Continued)

OTHER PUBLICATIONS

Patent Cooperation Treaty, International Search Report and Written Opinion, issued in International Application No. PCT/EP2016/071793, by European Searching Authority, document of 6 pages, dated Jun. 2, 2016.
(Continued)

*Primary Examiner* — John Bastianelli
(74) *Attorney, Agent, or Firm* — Akerman LLP; Peter A. Chiabotti

(57)    ABSTRACT

An electromagnetic actuator of a valve device, in particular in a common rail system of a motor vehicle, comprising an armature for actuating a valve element located in a duct, said armature being arranged in a housing and being movable axially along a longitudinal axis of the actuator when an excitation coil is energized, further comprising a pole core, characterized in that the electromagnetic actuator is designed as an electromagnetic adhesive system that com-
(Continued)

prises a plate-type armature which entirely covers planar end faces of the pole core that extend orthogonally to the longitudinal axis.

10 Claims, 6 Drawing Sheets

(51) Int. Cl.
| | | |
|---|---|---|
| F04B 7/00 | (2006.01) | |
| H01F 7/08 | (2006.01) | |
| F02M 63/00 | (2006.01) | |
| H01F 7/16 | (2006.01) | |
| F02M 59/36 | (2006.01) | |
| F02M 51/06 | (2006.01) | |

(52) U.S. Cl.
CPC ........ *F02M 59/368* (2013.01); *F02M 59/466* (2013.01); *F02M 63/0017* (2013.01); *F02M 63/0035* (2013.01); *F04B 7/0076* (2013.01); *H01F 7/081* (2013.01); *H01F 7/16* (2013.01); *H01F 7/1638* (2013.01); *F02M 63/0071* (2013.01); *F02M 2200/8053* (2013.01); *F02M 2200/855* (2013.01); *H01F 2007/086* (2013.01)

(58) Field of Classification Search
CPC .......... F04B 7/0076; F02M 2200/8053; F02M 63/0071; F02M 2200/855; F02M 51/061; F02M 51/0678; F02M 63/0035; F02M 63/0017; F02M 59/368; F02M 59/466
USPC ........................................ 251/129.16, 129.15
See application file for complete search history.

(56) References Cited

U.S. PATENT DOCUMENTS

| | | | | |
|---|---|---|---|---|
| 2,491,905 | A * | 12/1949 | Ray | F25B 41/062 |
| | | | | 137/262 |
| 3,144,047 | A * | 8/1964 | Tjaden | F16K 31/0675 |
| | | | | 137/625.48 |
| 5,447,288 | A * | 9/1995 | Keuerleber | G05D 16/2022 |
| | | | | 251/129.17 |
| 5,615,860 | A * | 4/1997 | Brehm | F16K 27/041 |
| | | | | 251/129.07 |
| 6,036,120 | A | 3/2000 | Varble et al. | |
| 7,871,058 | B2 * | 1/2011 | Robinson | B05C 5/0225 |
| | | | | 251/129.1 |
| 2014/0103243 | A1 | 4/2014 | Van Himme et al. | |
| 2015/0167611 | A1 | 6/2015 | Schulz et al. | |

FOREIGN PATENT DOCUMENTS

| | | |
|---|---|---|
| DE | 102011076784 A1 | 12/2012 |
| DE | 102012107764 A1 | 4/2014 |
| DE | 102013212231 A1 | 12/2014 |
| DE | 102014201385 A1 | 8/2015 |
| JP | S61-142978 U * | 9/1986 |
| JP | H0828402 A | 1/1996 |
| JP | 3598610 B2 | 12/2004 |

OTHER PUBLICATIONS

German Patent Office, "Office Action," issued in German Patent Application No. DE 10 2015 116 240.7, dated Aug. 12 2016, document of 6 pages.

* cited by examiner

ELECTROMAGNETIC ACTUATOR OF A VALVE DEVICE

CROSS REFERENCE TO RELATED APPLICATIONS

This application is a § 371 National Phase of PCT/EP2016/071793, filed Sep. 15, 2016, the entirety of which is incorporated by reference and which claims priority to German Patent Application No. 10 2015 116 240.7, filed Sep. 25, 2015.

BACKGROUND

The application relates to an electromagnetic actuator of a valve device, in particular in a common rail system of a motor vehicle having the features and structures described herein.

SUMMARY

Such electromagnetic actuators are known, e.g., from DE 10 2012 107 764 A1. It discloses an electromagnetic volume flow regulating valve which is arranged between a low-pressure pump and a high-pressure pump of a common rail system of a fuel injection system. In it the fuel is transported from a fuel tank via a transport line from the low-pressure pump to the high-pressure pump. At this time the fuel conducted from the low-pressure pump to the high-pressure storage, that is, to the common rail system is controlled as regards its amount by the cited volume flow regulating valve arranged in the transport line. The volume flow regulating valve is constructed as a so-called "Normally Open" valve, which has the decisive advantage that in case of a defect or failure of the valve, fuel can still be transported in any case into the rail, that is, into the high-pressure storage and no failure function of the internal combustion machine can occur, in contrast to the "Normally Closed" valves, if the valve becomes defective or fails.

However, the valves known for this application in the common rail system have the problem that they are regularly constructed as regulating valves. Such regulating valves require a complicated designing of the pole core with a control cone and a corresponding adaptation of the associated armature. In addition, the known volume flow regulating valves are very adjustment-sensitive and must therefore be very precisely assembled. This results in an increased expenditure for the assembly.

This is where the present application begins.

The present disclosure has the problem of indicating an electromagnetic actuator of a valve device which is constructed more simply and can be assembled more simply in comparison to the previously used volume regulating valves. No welding connections for holding the individual components of such an electromagnetic actuator against each other are required. This goal is achieved by an electromagnetic actuator having the features and structures described herein.

The present disclosure is based substantially on the fact that the electromagnetic actuator is constructed in the manner of an electromagnetic adhesion system with a plate-shaped armature which extends completely over the front surfaces of the pole core which are arranged in a planar and orthogonal manner to the longitudinal axis of the actuator.

It is also advantageously provided that the plate-shaped armature not only extends completely over the planar front surfaces of the pole core but also additionally over housing sections of the housing which extend like flanges into the interior of the housing of the electromagnetic actuator.

Traditional volume flow regulating valves which are very expensive to manufacture and are like those previously used between low-pressure pumps and high-pressure pumps of common rail systems are replaced by electromagnetic switching valves constructed in a simple manner. The electromagnetic switching valve is provided with a plate-shaped armature which is fastened standing in a fixed manner on an axial stem and extends completely over the planar front sides of the pole core.

The electromagnetic actuator according to the present disclosure can be readily used in a fuel conduit of a cylinder head in a high-pressure pump of a motor vehicle for activating a valve element built in there in an accessible manner. The valve element is built into the cylinder head in such a manner that it frees or closes the conduit from an inlet to an outlet in the non-activated state. This valve element is loaded to this end by a spring device in such a manner that when there is no force acting on the valve element from the outside, the spring device ensures that the valve element closes the valve seat from the inlet to the outlet.

However, according to the present disclosure, this valve element located in the cylinder head can be activated from the outside by an electromagnetic actuator. This takes place in that an electromagnetic actuator according to the present invention is placed, in particular screwed in the area of the valve element onto the cylinder head of the high-pressure pump and a contact surface of the magnetic actuator presses against the valve element in order to free this conduit so that in particular fuel can flow from the inlet to the outlet.

BRIEF DESCRIPTION OF THE DRAWINGS

The electromagnetic actuator according to the present disclosure is explained by way of example using several figures in conjunction with the activation of the valve element on the cylinder head of a high-pressure pump in a common rail system. In the figures.

In the following figures the same reference numerals designate the same parts with the same meaning unless otherwise indicated.

DETAILED DESCRIPTION

Figure 1:
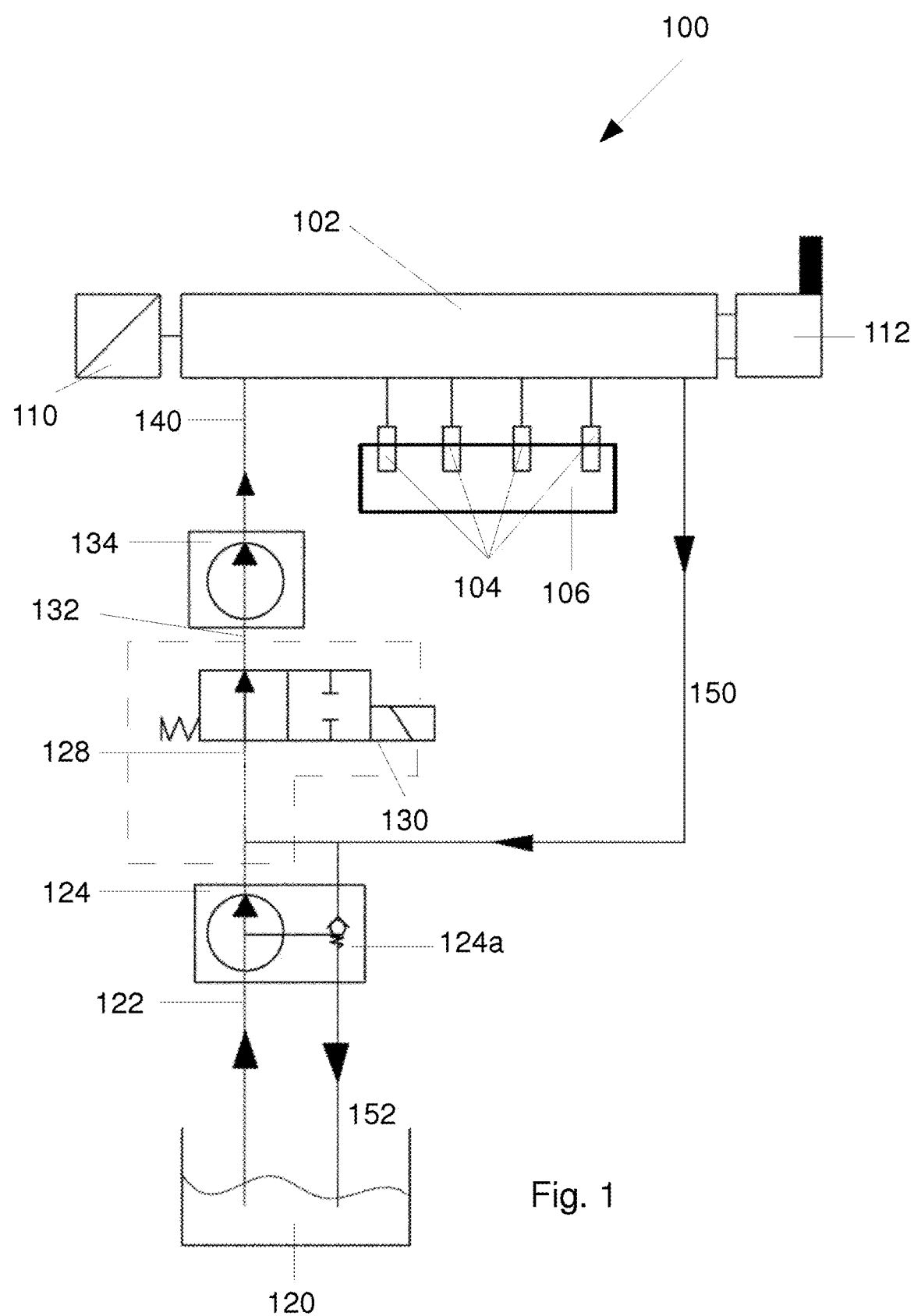
FIG. 1 shows a basic flowchart of a fuel circuit in a common rail system of a motor vehicle with an electromagnetic valve device according to the present disclosure which is built in between a low-pressure pump and a high-pressure pump.

The fuel circuit system schematically shown in FIG. 1 such as it is used, for example, in diesel motor vehicles comprises a high-pressure storage, called a common rail 102 in the following. This common rail 102 supplies injection nozzles, so-called injectors 104 like those built into an engine block 106 of a motor vehicle. FIG. 1 shows four such injectors 104, wherein even more or less such injectors 104 can be supplied by the common rail 102. A pressure sensor 110 is connected to the common rail 102 which sensor communicates with a control system which is not shown and which measures and monitors the pressure in the common rail 102. In addition, this common rail 102 communicates on its output side with an overpressure valve 112 in order to be able to let off any overpressure present in the common rail 102 in case of a disturbance.

The common rail 102 communicates at its inlet side with a tank 120 for the fuel. The tank 120 is connected to this end by a supply line 122 to a low-pressure pump 124. This low pressure pump 124 communicates via another supply line 128 with a valve device 130 which is connected on the output side via a line 132 to a high-pressure pump 134. This high-pressure pump 134 is connected via a line 140 to the input of the common rail 102. The common rail 102 communicates on its output side with a discharge line 150 which returns non-used fuel to the line 128 between the low-pressure pump 124 and the valve device 130. Excess fuel can be conducted from the supply line 150 via another line 152 back to the tank 120 via a valve 124a located in the low-pressure pump 124.

The amount of fuel which the high-pressure pump 134 supplies to the common rail 102 is controlled by the valve device 130. The valve device 130 is explained in detail in conjunction with the FIGS. 2 to 6 shown in the following. This concerns a so-called "normally open" valve which is open in the currentless state of an exciting coil of the electromagnetic actuator and therefore releases the fuel from the low-pressure pump 124 to the high-pressure pump 134.

Figure 2:
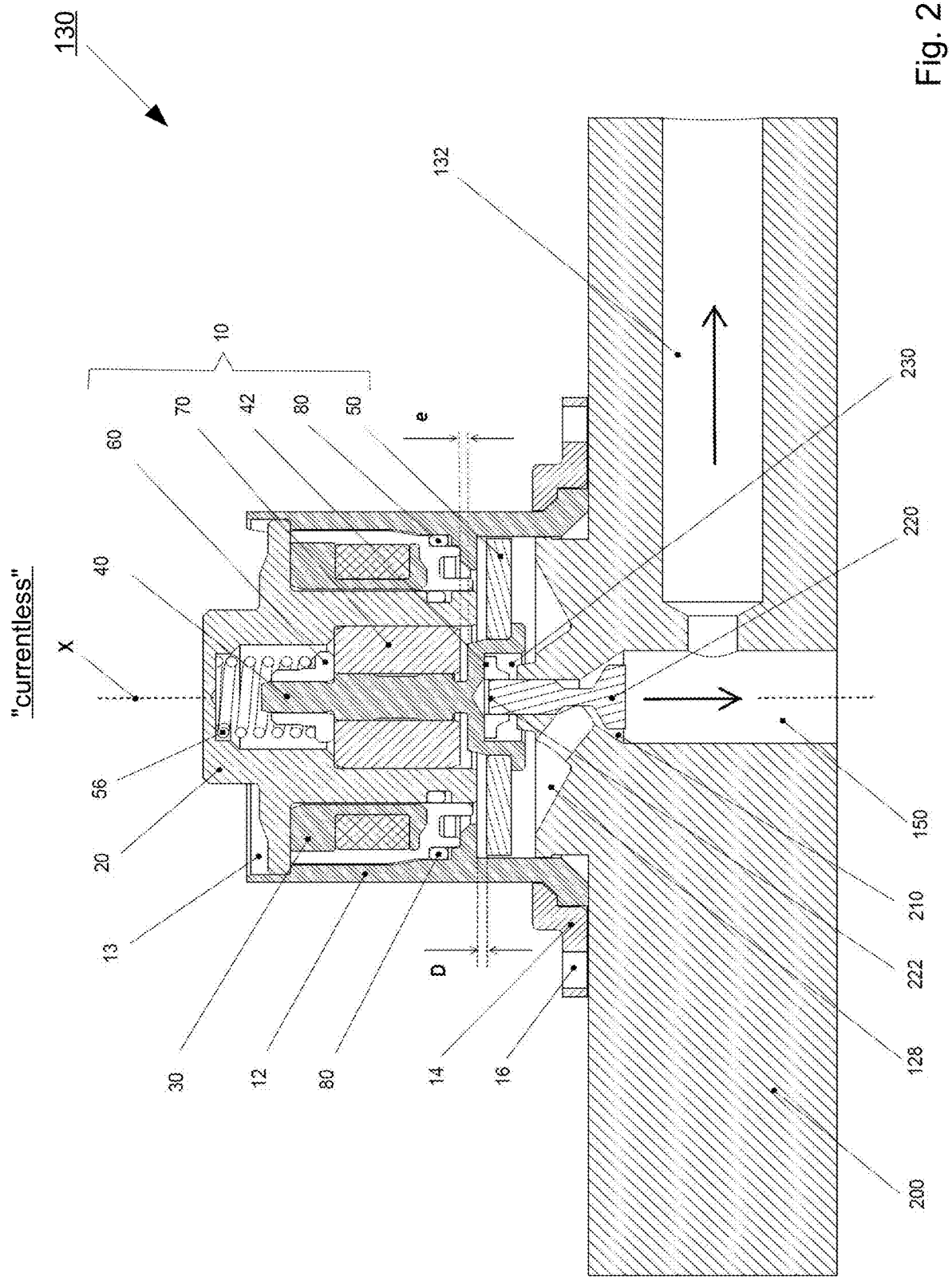
FIG. 2 shows a sectional view of the electromagnetic valve arrangement of FIG. 1 with an electromagnetic actuator according to the disclosure and how it is fastened in the area of a valve element onto the cylinder head of an engine block, namely in the currentless state.

The assembly situation of the valve device 130 of FIG. 1 is shown in FIG. 2. The cylinder head housing 200 of the high-pressure pump 134 is shown in section and partially comprises the lines 128, 132 as well as 150 explained in conjunction with FIG. 1. A valve seat 210 is provided in the cylinder head housing 200 which seat can be closed by a valve element 220 in order to open or close the fuel supply in the line 128 which comes from the low-pressure pump in the runoff direction in the line 132 to the high-pressure pump. FIG. 2 shows the open state in which the fuel can flow from the line 128 to the line 132. The valve element 220 is lifted off here from the valve seat 210 so that the latter is freed. The fuel flow is marked in FIG. 2 by the flow arrows.

As FIG. 2 shows, the valve element 220 is in a position raised from the valve seat 210 which is conditioned by the fact that a contact surface 42 of an electromagnetic actuator 10 presses against the valve element 220 and holds it down if this contact surface 42 does not press against the valve element 220, the valve element 220 is pressed upward by a spring device 230 in the view of FIG. 2 so that the valve element 220 can close the valve seat 210. This is explained in more detail below. The electromagnetic actuator 10 is set on the cylinder housing 200 fitting it in such a manner that the cited activation of the valve element 220 can be brought about.

Figure 3:
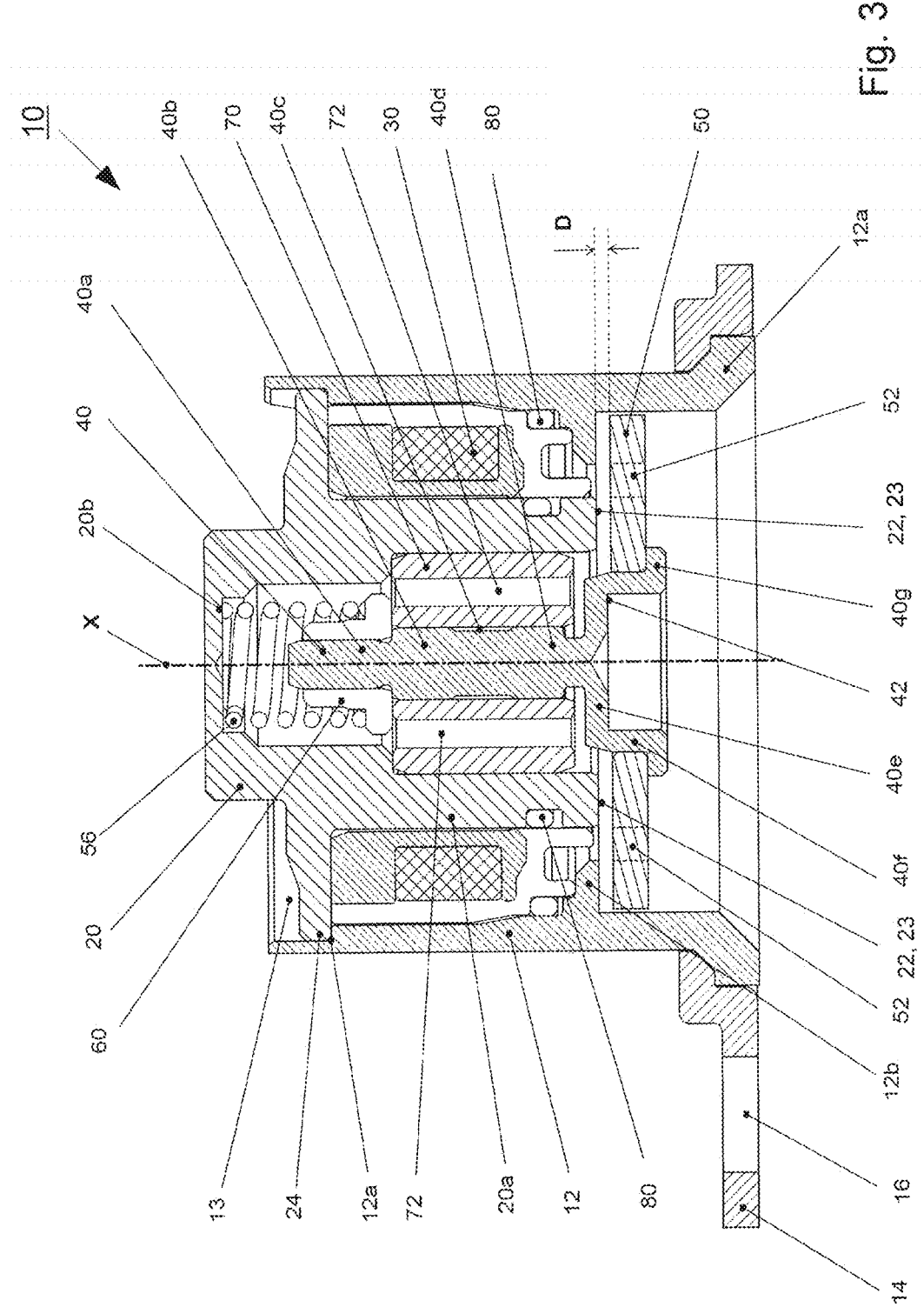
FIG. 3 shows the electromagnetic actuator represented in FIG. 2 in an enlarged view in an individualized view.

As can also be clearly seen in particular in the enlarged view of the electromagnetic actuator 10 in FIG. 3, the electromagnetic actuator 10 comprises a tubular housing 12 which is set with an outwardly projecting flange projection 12a onto the cylinder head housing 200. In order to hold this housing 12 on the cylinder head housing 200, an annular flange 16 with fastening openings 16, in particular with screw holes, is set in an inverted position over the housing wall 12 in order to be able to fasten the electrical actuator 10 on the cylinder head housing 200. The housing 12 is closed by an annular housing cover 13 on its opposite side. The housing 12 is arranged in a rotationally symmetrical manner around a longitudinal axis X of the electromagnetic actuator 10, wherein this longitudinal axis X is ideally aligned with the central axis of the previously cited valve element 220.

A cup-shaped pole core 20 consisting of magnetically conductive material, in particular of automatic steel is located inside the housing 12 in a rotationally symmetrical manner around the longitudinal axis X. The cup-shaped pole core comprises an annular wall 20a running around the longitudinal axis X which wall is open in the direction of the cylinder head housing 200 and has planar front surfaces 23 arranged orthogonally to the longitudinal axis X. On the opposite side this pole core 20 projects with its circumferential wall 20a out of the housing cover 30. The circumferential wall 20a is closed there by a cover-side wall 20b of the pole core. In addition, the pole core 20 comprises a flange 24 in its upper area which flange moves away in an annular manner from the longitudinal axis X, is seated directly below the housing cover 13 and is seated on a shoulder 12a of the circumferential wall of the housing 12. An exciting coil 30 is arranged between the circumferential wall of the housing 12 and the circumferential wall 20a of the pole core 20. This exciting coil 30 is advantageously molded by plastic and held in the cited intermediate space between housing 12 and pole core 20. As FIG. 3 in particular shows especially well, a suitable seal in the form of sealing rings 80 is placed between the housing 12 and the pole core.

An axial stem 40 is arranged inside the cup-shaped pole core 20 centrally to the central axis X, which stem is preferably formed from hard metal, in particular the metal 100Cr6. Other metals are also possible, in particular also plastic which can preferably be reinforced with glass fibers or the like. In addition, this axial stem 40 can be magnetically conductive but does not have to be. The axial stem 40 is guided in a guide sleeve 70 which also preferably consists of hardened steel or high-performance plastic. The axial stem 40 projects at the top as well as at the bottom out of this guide sleeve 70. The section 40a of the axial stem 40 projecting at the top out of the guide sleeve 70 has a slightly smaller diameter than the section 40b of the axial stem 40 which is seated inside the guide sleeve 70. A spring device 76, in the present case a spring, is placed around the section 40a, which spring is supported on the one hand on the inside of the cover-side wall 20b of the pole core 20 and on the other hand on the projecting flange of a spring plate 60. The spring plate 60 is firmly connected to the axial stem 90 so that the spring device 46 presses the axial stem 40 downward so that the spring plate 60 strikes against the guide sleeve 70. Since the guide sleeve 70 has a fixed connection with the pol core 20, a further downward moving out of the axial stem 40 is not possible.

This axial stem 40 widens out like a cup in its bottom section 40e of the axial stem 40 projecting out of the guide sleeve 70. To this end the axial stem 40 comprises a section 40e which runs orthogonally to the longitudinal axis X and forms the bottom of this cup-shaped, widened-out area as well as comprises a wall 40f which is again circumferentially parallel to the longitudinal axis X and terminates at its lowest end by an outwardly projecting and annularly formed section 40g.

An annular armature plate 50 is fixed, for example by welding or pressing, on this lower section 40f of the axial stem 40. This annular and plate-shaped armature 50 comprises a plurality of through bores 52 and extends orthogonally to the longitudinal axis X and close to the circumferential wall of the housing 12. The plate-shaped armature 50 consists of a magnetic material in order to make possible an optimal magnetic flux. As can be seen in FIG. 2 and FIG. 3, a flange-like section. 12b of the housing 12, which section extends inward in an annular manner, extends above the plate-shaped armature 50 in the direction of the longitudinal axis X. The plate-shaped armature 50 also extends over this section 12a of the housing 12. The plate-shaped armature 50 is fastened in such a manner to the axial stem 40 that in the resting state of this electromagnetic actuator 10, that is, with a currentless exciting coil 30, a maximum distance D of, for example, approximately 0.8 mm is adjusted between the top of the plate-shaped armature 50 and the planar front side 22 of the circumferential wall 20a of the pole core 20. The lower surface of the section 12b of the housing 12 is advantageously precisely aligned with the planar front surface 22.

The bottom wall of the wall section 40e of the axial stem 40 forms a stop surface 42 or contact surface for the valve element 220 of FIG. 2. In the currentless state of the electromagnetic actuator 10 this contact surface 40 tube is positioned in such a manner that the valve element 220 is pressed into its open position, as FIG. 2 shows. A fuel flow from the line 122 the line 132 and therefore from the low-pressure pump to the high-pressure pump is ensured as a result.

The electromagnetic actuator 10 is dimensioned in such a manner as regards its dimensions that when the exciting coil 30 is receiving current, a magnetic flux is generated which runs from the wall of the housing 12 via the plate-shaped armature 50 and the air gap P to the pole core. The magnetic force resulting from this draws the plate-shaped armature 50 upward, as a result of which the air gap D is reduced. At this time the magnetic force overcomes the spring force exerted by the spring device 56 so that the axial stem 40 and the plate-shaped armature 50 can actually be moved upward. In order to avoid that the cited air gap D becomes zero, that is, the armature 50 strikes against the planar front surface 22 of the pole core 20 and is "magnetically firmly adhered" there, the axial length of the guide sleeve 70 and the section 40e of the stem are coordinated in such a manner with one another that the distance between the section 40e of the axial stem 40 to the lower wall of the guide sleeve 70 is smaller than the above-cited maximally possible gap D. The distance between the section 40e of the axial stem 40 and the lower wall of the guide sleeve 70 can be, for example, 0.6 mm so that when the exciting coil is receiving current, the section. 40e of the axial stem 40 strikes the guide sleeve 70 and a minimum gap D of approximately 0.2 mm remains between the plate-shaped armature 50 and the planar front surface 22 of the pole core 20.

Figure 4:
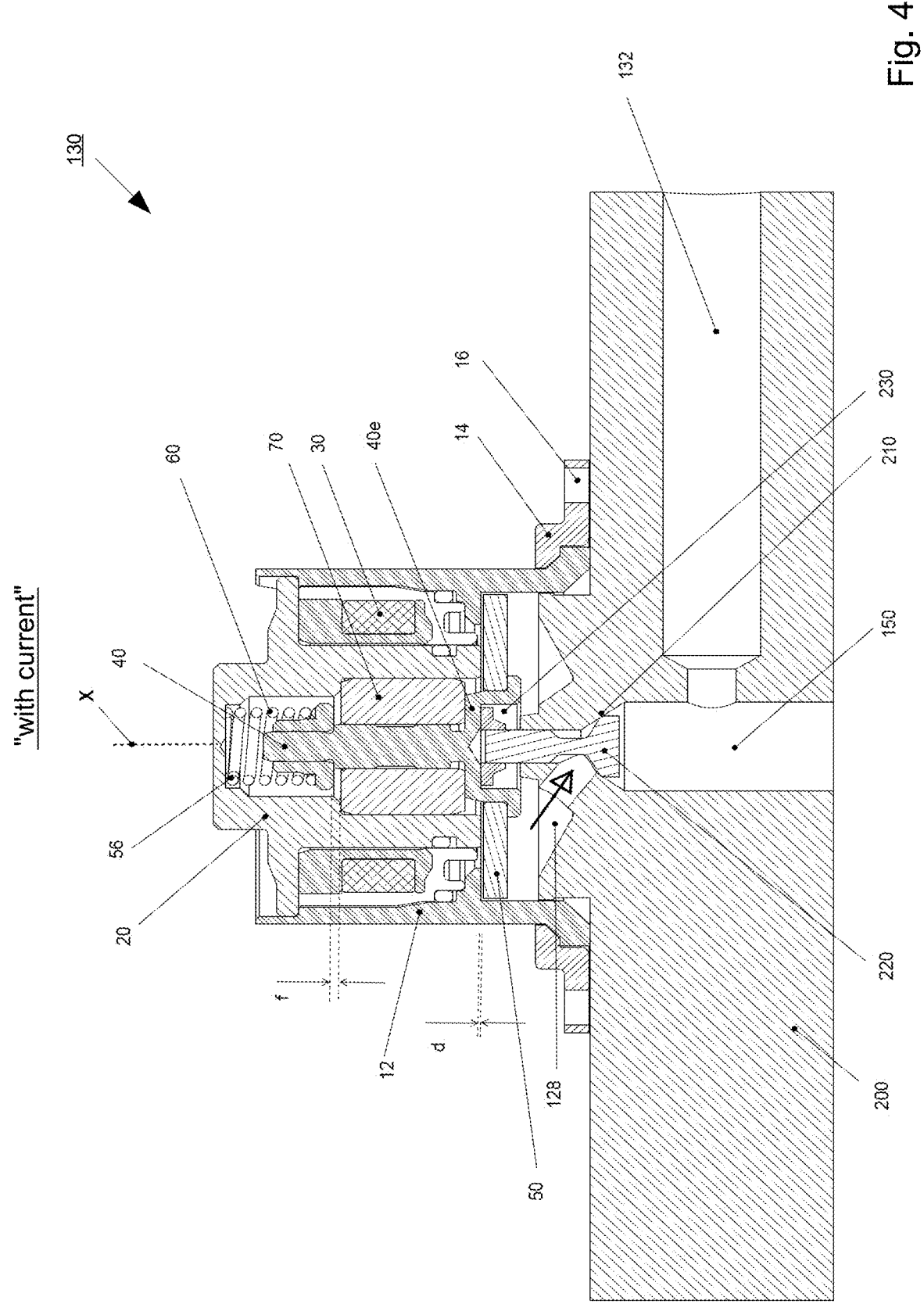
FIG. 4 shows a view similar to the one in FIG. 2 in which, however, the electromagnetic actuator receives current.

The state of the electromagnetic actuator 10 when the exciting coil 30 is receiving current is shown in FIG. 4. It can be clearly recognized there that the section 40e of the axial stem 40 strikes against the bottom of the guide sleeve 70 and that a minimum gap d remains between the lower, planar front surface 22 of the pole core 20 and the plate-shaped armature 50. At the same time the valve element 220 follows the upward movement of the axial stem 40 and the associated upward movement of the contact surface 42 on account of the spring device 230 pressing the valve element 220 upward. As a consequence, the valve element 220 closes the valve seat 210. Therefore, no more fuel can flow from the line 128 to the line 132. As a consequence, the fuel can be compressed in the line 150.

It should be noted here that the opening and closing of the valve seat 210 takes place with a frequency in the range of about 100 Hz. It is therefore necessary that a sufficiently good guidance is ensured with little friction and resistance in the electromagnetic actuator 10. To this end the plate-shaped armature 50 comprises the already-cited passage bores 52 which serve for pressure compensation. The guide sleeve 70 also comprises passage bores 72 which serve for pressure compensation. Finally, the axial stem 40 also comprises a circumferential, tapering area 40d in its section 40b inside the guide sleeve 70 in order to minimize the friction between the guide sleeve 70 and the axial stem 40.

Figure 5:
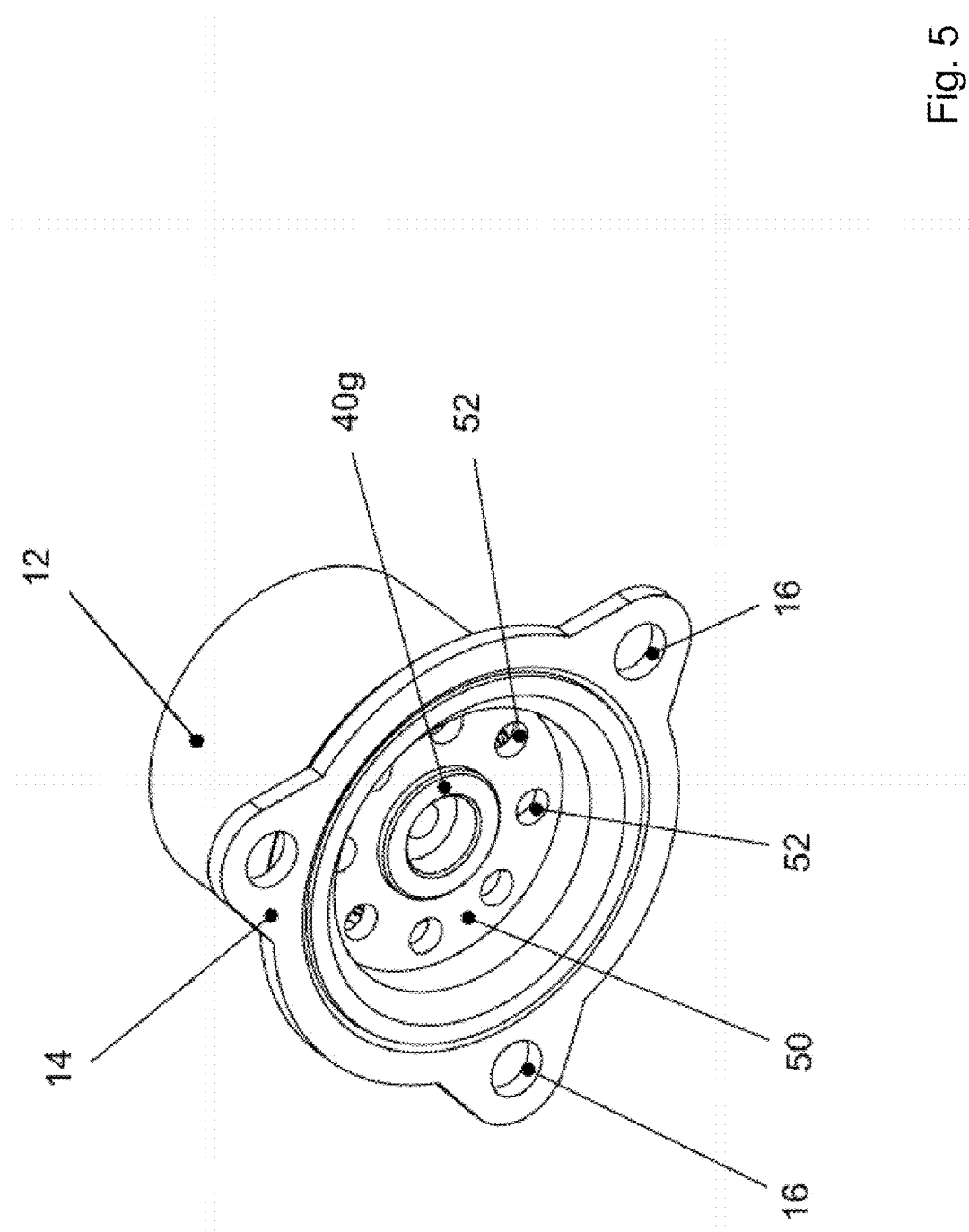
FIG. 5 shows the electromagnetic actuator according to the FIGS. 2 to 4 in a perspective view looking from below into the housing and with the plate shaped armature arranged in it.
Figure 6:
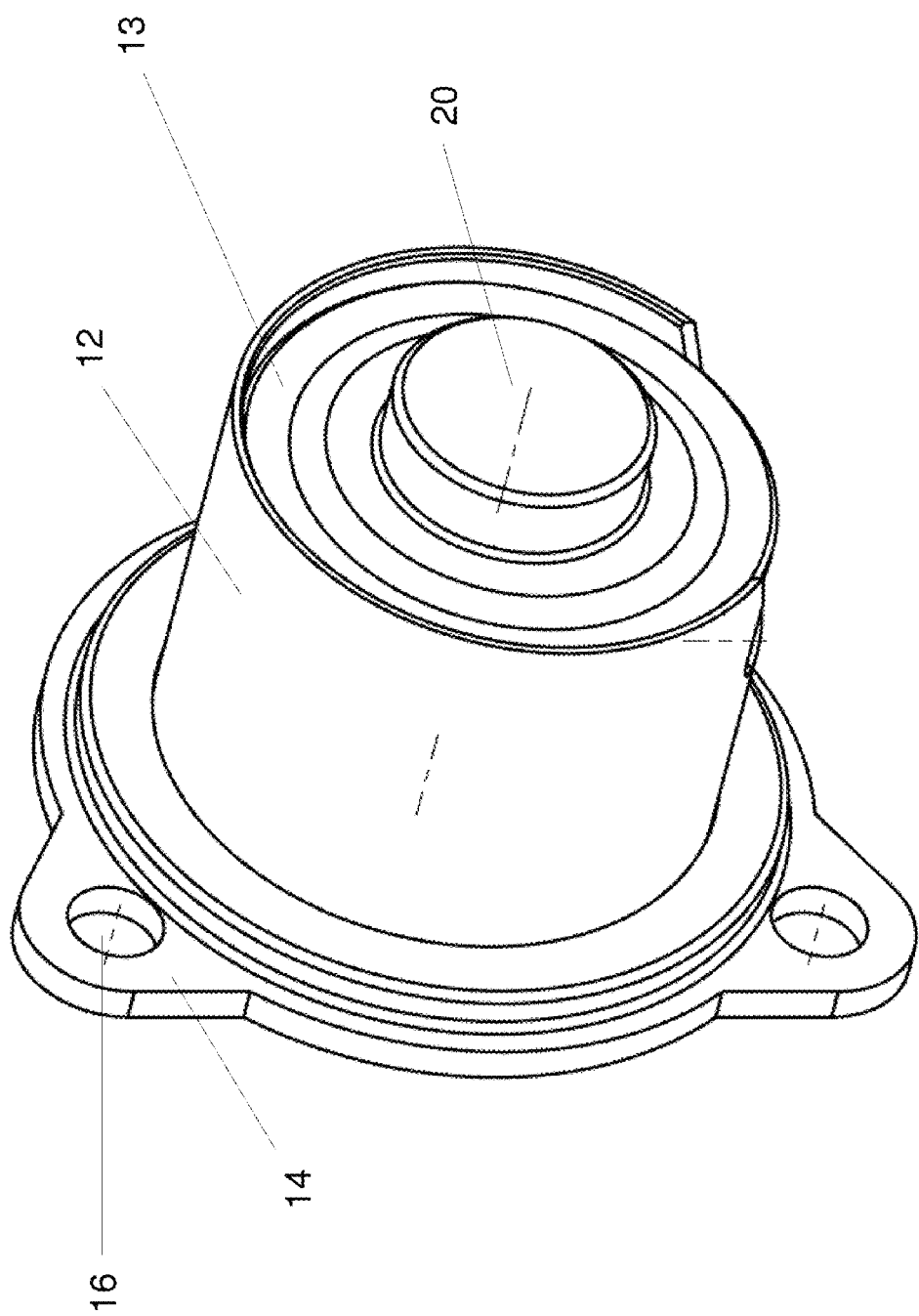
FIG. 6 shows a perspective view of the electromagnetic of FIG. 5 looking obliquely from the rear onto the housing with a housing cover and with the pole core extending out of the housing cover.

FIG. 5 and FIG. 6 show perspective views from the oblique front and the oblique rear onto the magnetic actuator 10. FIG. 5 shows in an especially clear manner the plate-shaped armature 50 constructed in the shape of an annulus with the plurality of passage openings 52. The front, circumferential flange 40g of the axial stem 40 can also be well recognized. In addition, the annular fastening flange 14 with its fastening openings 16 pushed onto the housing 12 can be well recognized.

The pole core 20 extending out of the housing cover 13 of the housing 12 can be recognized in FIG. 6.

A significant advantage of the actuator 10 of the present disclosure is the fact that the lift of the armature 50 can be adjusted by the assembly process. Here, the armature 50 pressed onto the preferably hardened axial stem 40 is inserted into the guide sleeve 70. A defined axial play can be adjusted during the assembly by a fork-shaped distancing piece between the guide sleeve 70 and the spring plate 60. Two end stops result during the assembly, one on the front side on the axial stem 40 and the guide sleeve 70 and between the spring plate 60 and the guide sleeve 70.

LIST OF REFERENCE NUMERALS 10 electromagnetic actuator
12 housing
12a flange projection of the housing
12b annular section
13 housing cover
14 flange
16 bore
20 pole core
20a annular wall
20b cover-side wall
22 planar front surfaces
24 flange
30 exciting coil
40 axial stem
40a section of the axial stem
40b section of the axial stem
40c section of the axial stem
40d section of the axial stem
40e section of the axial stem
40f section of the axial stem
40g section of the axial stem
42 contact surface
50 armature plate
52 through bores
56 spring device
60 spring plate
70 sleeve
72 pressure compensation bores
80 sealing rings
100 fuel circuit system.
102 common rail, high-pressure line 104 injectors
106 engine block
110 pressure sensor
112 super pressure valve
120 tank
122 line
124 low-pressure pump with bypass
124a valve
128 line
130 valve device
132 line
134 high-pressure pump
140 supply line for 102
150 discharge line for 102
152 line
200 valve element, cylinder head housing
210 valve seat
220 valve body
230 spring device
232 contact surface
X central axis
D air gap large
d air gap small

The invention claimed is:

1. An electromagnetic actuator of a valve device comprising:
a plate-shaped armature which is arranged in a housing and which can move axially along a longitudinal axis of the actuator when an exciting coil is receiving current for activating a valve element, and with a one-piece cup-shaped pole core located inside the housing,
wherein the valve element is guided in the pole core,
wherein the electromagnetic actuator is configured such that when the exciting coil is receiving current, a magnetic flux is generated and runs from a wall of the housing via the plate-shaped armature and an air gap to the pole core and results in a magnetic force that draws pulls the plate-shaped armature and reduces the air gap,
wherein the plate-shaped armature extends completely over open front surfaces of the cup-shaped pole core, the open front surfaces being arranged in a planar manner and orthogonal to the longitudinal axis,
wherein the plate-shaped armature is connected to an axial stem, the axial stem being arranged inside the cup-shaped pole core and guided in a guide sleeve along the longitudinal axis,
wherein the axial stem widens out in a direction of the plate-shaped armature in a shape of a cup with a circumferential outer wall and an annular flange projecting outward on a distal end, wherein the plate-shaped armature is fixed on the circumferential outer wall of the axial stem and/or on the flange, and
wherein a bottom wall of a wall section of the axial stem forms a stop surface or contact surface for the valve element.

2. The electromagnetic actuator according to claim 1, wherein the axial stem is guided centrally along the longitudinal axis and in the guide sleeve.

3. The electromagnetic actuator according to claim 2, wherein the guide sleeve has compensation openings.

4. The electromagnetic actuator according to claim 2, wherein the axial stem has a first section that is located within the guide sleeve and a second section that projects beyond the guide sleeve, wherein the second section has a small diameter than the first section.

5. The electromagnetic actuator according to claim 4, wherein the plate-shaped armature has through bores.

6. The electromagnetic actuator according to claim 1, wherein the pole core is shaped like a cup and has an annular flange that is seated on the housing.

7. The electromagnetic actuator according to claim 1, wherein the air gap is up to 0.8 mm when the exciting coil is not receiving current and the air gap is up to 0.2 mm when the exciting coil is receiving current.

8. The electromagnetic actuator according to claim 1, wherein the housing comprises a housing cover which is joined by flanging to a circumferential housing wall of the housing.

9. The electromagnetic actuator according to claim 1, wherein the electromagnetic actuator is screwed onto a cylinder head housing of a high-pressure pump of a motor vehicle.

10. The use of an electromagnetic actuator according to claim 1 in a common rail system as the switching valve in a fuel line between a high-pressure pump and a low-pressure pump.

* * * * *